March 15, 1949.    F. P. STEINHAUER    2,464,465
ARTIFICIAL BAIT
Filed March 26, 1945
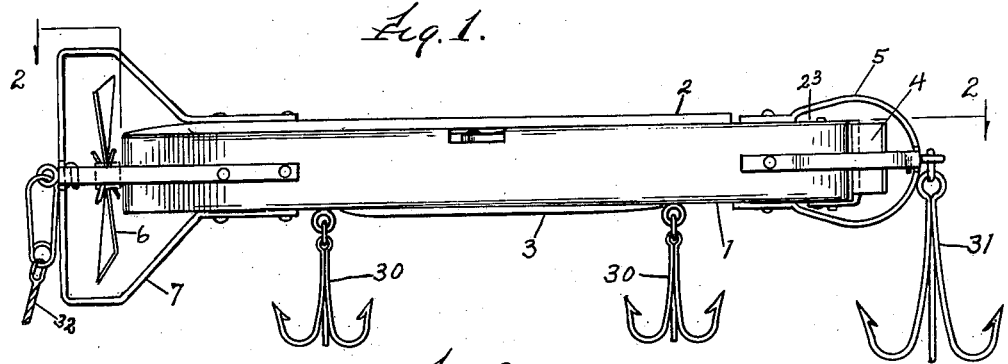
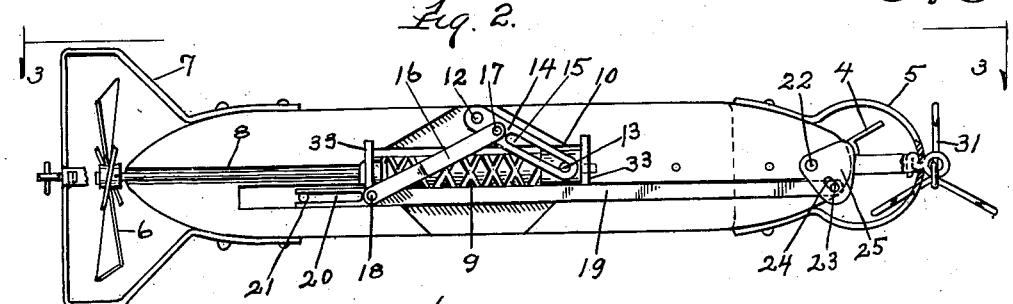
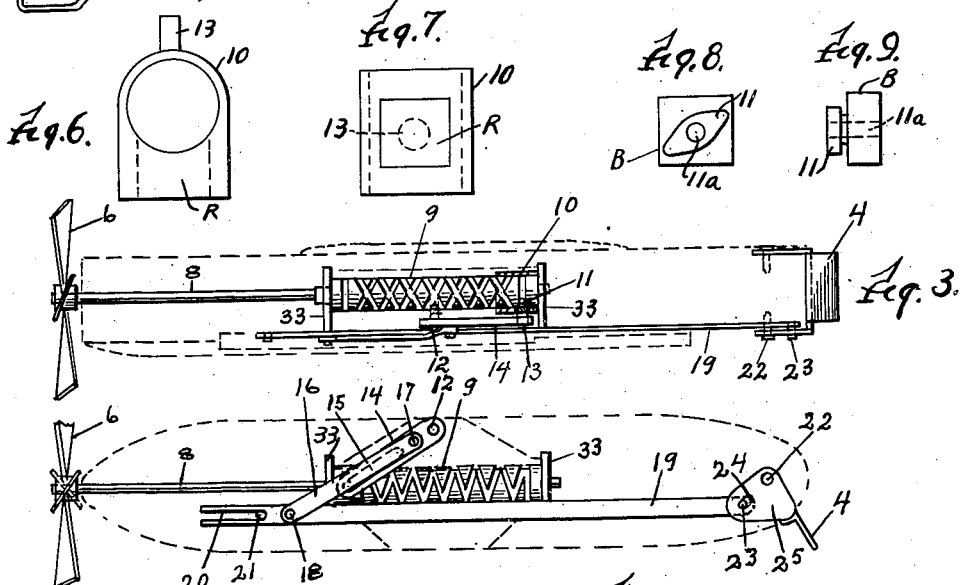
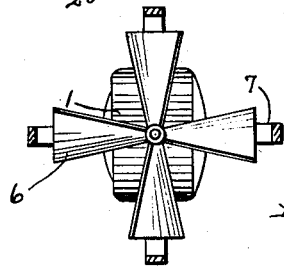
Inventor:
Fritz P. Steinhauer,
by Henry J. Pollenz
Attorney.

Patented Mar. 15, 1949

2,464,465

UNITED STATES PATENT OFFICE 2,464,465

ARTIFICIAL BAIT

Fritz P. Steinhauer, Chicago, Ill.

Application March 26, 1945, Serial No. 584,884

3 Claims. (Cl. 43—42)

My invention relates to artificial fish baits or lures of the plug type for use in fishing or catching the game fish, such as muskellunge, pike, and bass.

The main object of my invention is to provide an animated artificial bait whose live bait simulating movements are accomplished by power driven mechanism; the power for effecting such movements of the plug is produced in the plug's mechanisms whenever the plug is being drawn back or reeled in after having been cast.

I provide in my agitator plug a driving propeller which will be rotated by the impinging water when the plug is being drawn back through the water and will in turn rotate a multiple return grooved cylinder on whose shaft the propeller is mounted and this cylinder will actuate, through mechanisms associated therewith, a rudder at the rear end of the plug and thus change continually the course of the plug so steering the plug that it will travel in a sinuous or S-shaped course; such movement will simulate or imitate the swimming of a live bait and will induce the game fish to strike.

My agitator plug or lure may be made in a variety of shapes and sizes, to resemble as near as possible the small fish, large beetles, crayfish, etc., the morsels that the game fish sought to be caught relishes the most.

When my agitator plug is cast into the lair of the fish sought to be caught, the movements produced by the power driven mechanisms simulating another live creature in the lair will enrage the fish and it will attack, strike, and very likely will become impaled on the hooks.

The novel features of my power driven agitation casting plug or lure will be best understood from the following description of a preferred embodiment thereof selected for illustration and shown in the accompanying drawings, in which:

Fig. 1 is a side elevation of the agitator plug;

Fig. 2 is a top plan view, with the cover removed to expose the mechanism;

Fig. 3 is a detail side view of the steering drive mechanism, on line 3—3 of Fig. 2, the body of plug in outline only;

Fig. 4 is a detail of the steering drive mechanism, on line 2—2 of Fig. 1;

Fig. 5 is a front view of the driving propeller;

Fig. 6 is an end view of the sleeve 10;

Fig. 7 is a bottom view of the sleeve 10;

Fig. 8 is a top view of the pivoted pawl 11 on its pivot 11a, and supporting block B, and Fig. 9 is a side view of the pivoted pawl 11, the pivot pin 11a, and the block B.

Similar numerals indicate corresponding parts in the several views.

Numeral 1 indicates the body of the lure or agitator on and in which the various parts and mechanisms are mounted. Numeral 2 indicates the top cover and 3 the bottom cover; 4 is the steering rudder at the rear of the lure; 5 is the guard or bail for the rudder; 6 is the driving propeller for actuating the rudder; 7 is the guard for the propeller; 8 is the propeller shaft extending into the body of the lure to the multiple return grooved cylinder 9 which it drives; this multiple return grooved cylinder is similar to those used in spooling devices for laying the line, thread, string, etc., evenly over the width of the spool; the pivoted tracer or pawl 11 that traverses the reverse grooves of the cylinder is carried inside a sleeve 10 which has a sliding fit over the grooved cylinder 9. The sleeve 10 is provided with a round lug or pin 13 and a rectangular recess R; the recess R is adapted to receive the rectangular block B which carries the pivot pin 11a for the pawl 11; the size of the block B is such that it fits tightly into the recess R of the sleeve 10 into which it is inserted, with the pawl 11 on pivot 11a, after the multiple return grooved cylinder had been placed in the sleeve 10, care being taken that the pawl 11 enters the groove of the cylinder; the round lug 13 on the outside of the sleeve 10 engages in the slot 15 of the lever 14 which is pivoted to the body 1 at 12; 16 is a link, one end of which is pivoted to lever 14 at 17, and the other end is pivoted to another link 19 at 18; sliding link 19 is provided with a guiding slot 20 which embraces a fixed guiding pin 21; a fixed pin or stud 23 is secured to the other end of 19; this pin 23 is adapted to connect link 19 with the bellcrank lever 25 in the slightly elongated hole 24; the bellcrank lever plate 25 is pivoted on the body 1 at 22, which also serves as the pivot or journal for the rudder 4 which is attached to and carried by the lever plate 25; 30 and 31 are the fish hooks; 32 is the casting or fish line; 33 are the bearings for the multiple return grooved cylinder shaft.

In fishing for game fish the most important thing to do is to locate the lair inhabited by the game fish. If the fisherman locates or thinks he has located the lair he casts the lure or agitator into the water there and then starts to reel in the line moving the plug in the water; the propeller will then be rotated by the impinging water and in turn will rotate the multiple return grooved cylinder; as this cylinder is rotated the sleeve carrying the pivoted tracer will travel from one end of the cylinder to the other end and thus actuate the rudder, swinging it from right to left and vice versa thus changing the course of the plug continually, in a sinuous or S movement and simulating a live bait, thus luring the game fish to strike. If the fisherman happens to be lucky enough to have cast the agitator plug into the game fish lair the movements of the plug simulating a live creature will enrage the fish and it will attack or strike, even if not hungry just then, and very likely will become empaled on the hooks.

Above I have described and illustrated the preferred embodiment of my invention; many variations may be made without departing from the scope of my invention.

I claim:

1. An artificial bait comprising a body, a rotatable driving propeller mounted at the front end of the body and on a shaft journalled in said body, a multiple return grooved cylinder mounted in said body and connected to said shaft, a movable sleeve embracing said cylinder and carrying a lug on the outside and a pivoted pawl on the inside, a lever having one end pivoted on the body and having a slot extending toward the other end, the lug on said sleeve engaging said slot, a link having one end pivotally connected to the lever and the other end connected to a sliding link one end of which is pivotally connected to a bellcrank lever, a rudder secured to the bellcrank lever, and empaling means attached to the body.

2. An artificial bait comprising a body, a multiple return grooved cylinder, a rotatable driving propeller adapted to rotate said multiple return grooved cylinder, a movable sleeve embracing said cylinder and having a fixed lug thereon, a lever pivoted on the body and having a slot thereon engageable by said lug, a rudder having a bellcrank lever, and link mechanism pivotally connected to said slotted lever and to said bellcrank lever.

3. An artificial bait comprising a body, a rudder mounted on the body and provided with a bellcrank thereon, a multiple return grooved cylinder mounted in said body, a slidably movable sleeve on said cylinder and having a pivoted pawl mounted therein, said pivoted pawl being adapted to travel in the groove of the cylinder, a pivoted lever operatively connected with said sleeve, a link pivotally connected with said lever and the bellcrank lever of the rudder, a propeller adapted to rotate said cylinder, and empaling means attached to the body.

FRITZ P. STEINHAUER.

No references cited.